UNITED STATES PATENT OFFICE.

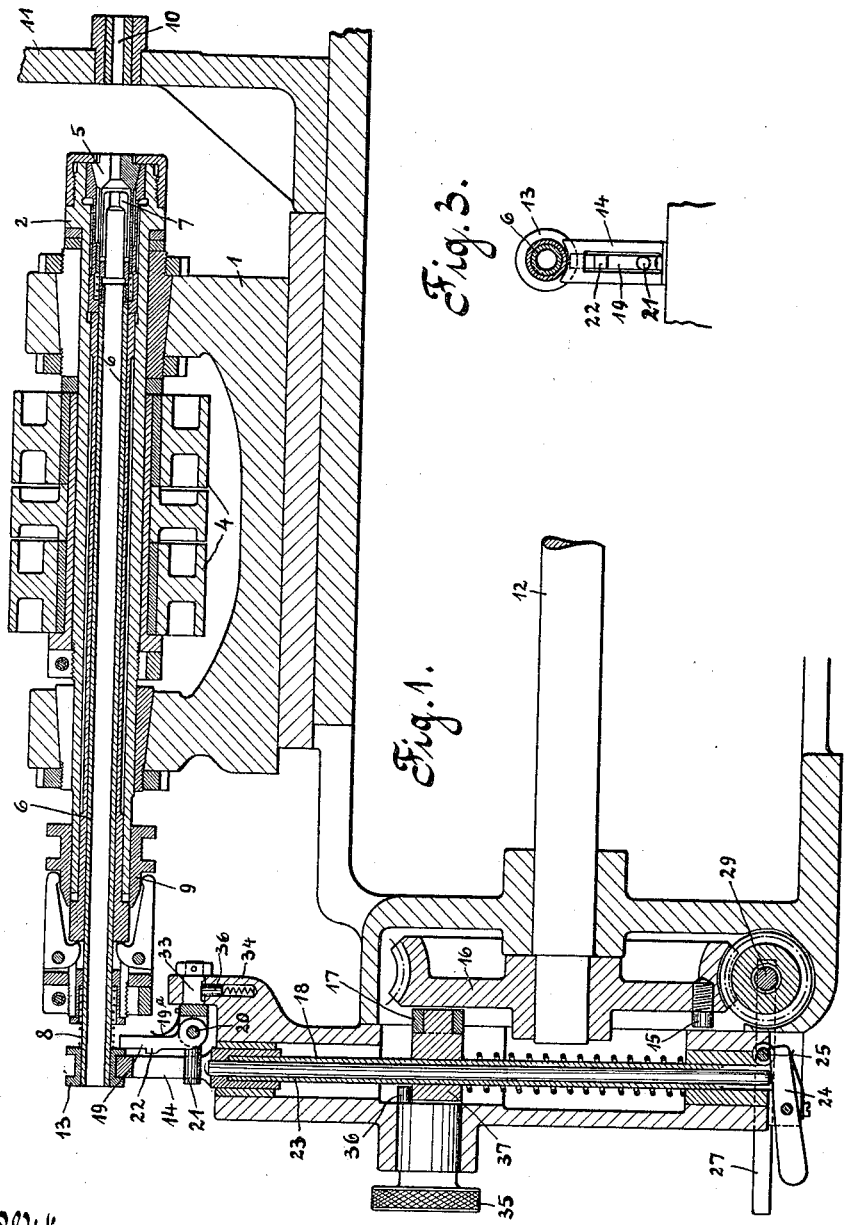

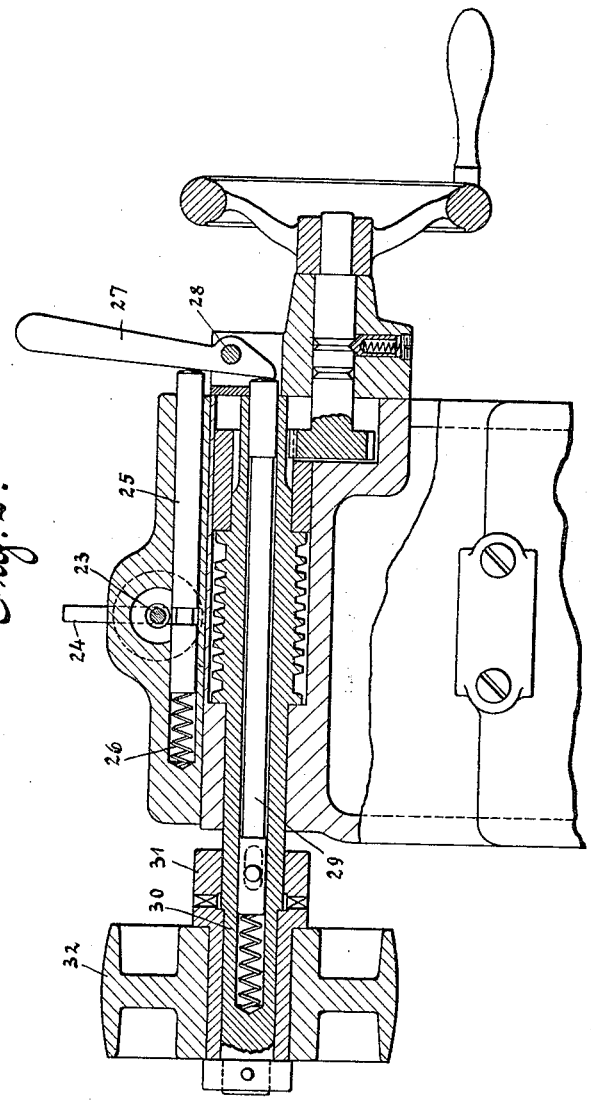

KARL JUNG, OF BERLIN, GERMANY, ASSIGNOR TO THE GENERAL COMPOSING COMPANY, GESELLSCHAFT MIT BESCHRANKTER HAFTUNG, OF BERLIN, GERMANY, A CORPORATION OF PRUSSIA.

AUTOMATIC LATHE.

1,140,463.      Specification of Letters Patent.      Patented May 25, 1915.

Application filed March 14, 1914. Serial No. 824,675.

*To all whom it may concern:*

Be it known that I, KARL JUNG, manager, a subject of the German Emperor, and residing at 58–59, Grossbeerenstrasse, Berlin, State of Prussia, and German Empire, have invented certain new and useful Improvements in or Relating to Automatic Lathes, of which the following is a specification.

The invention relates to an automatic lathe (a forming or automatic screw cutting lathe) in which the spindle support is moved to and fro in course of the working and the spindle is made hollow and into the hollow spindle a feed spindle is provided, by means of which the material to be worked is conveyed in the form of bars or rods to the conical grip fixed on the front of the spindle. In the hitherto known forms of construction of such machines the spindle has had to be removed from its bearings in order that the conical grip might be exchanged, as an exchange in the forward direction was impossible in consequence of the arrangement of the vertical slide holder. The difficulties associated herewith are obviated by the invention in the following manner:—The spindle-support with the spindle can be moved from the vertical slide holder beyond the back working position so that the exchange of the conical grip can be effected without removing the spindle-support cover or the vertical slide holder. The known machines of the kind coming under consideration have also a device for stopping the machine in case of a failure of material by releasing the feed-spindle sleeve that is mounted in the spindle so as to be axially movable. This device is also improved through the invention in this manner, viz., by a bolt being controlled through the feed-spindle sleeve, which bolt when the sleeve springs out is carried along by the bolt that releases the sleeve, so that the stopping is effected positively.

The drawing illustrates one example of the carrying out of the invention.

Figure 1 is a longitudinal section of the part of the machine coming under consideration. Fig. 2 is a partial plan of the same. Fig. 3 a view from the left of the upper part of Fig. 1.

The support 1 for the spindle 2 is arranged in a suitable manner on the table 3 of the machine so as to be movable in the axial direction. The device for actuating the support is not shown in the drawing. The spindle is operated by means of the belt pulleys 4. The spindle carries in front in the known manner the conical grip 5 which is interchangeable. The spindle is made hollow and into it the feed-spindle sleeve 6 is pushed, which is also hollow and serves for receiving the material in the form of rods or bars. On the front end of the sleeve 6 the feed-spindles 7 are seated which lie in the known manner tightly around the work. A spring 8 has a tendency to pull the feed-spindle sleeve out of the spindle 2.

The device acts as follows: When the support 1 moves backward (in Fig. 1 to the left) the material held firmly by the feed spindle is pushed through the conical grip 5. At the end of the backward movement the conical grip is closed in the known manner by the clamping device 9 and in the forward movement of the support 1 that is now effected, the conical grip pushes the material through the guide-sleeve 10 of the vertical slide holder 11 and the working is effected by the tool arranged on the holder 11 or directly on the table 3, lying to the right of the holder in Fig. 1, this tool being operated in the known manner by the operating shaft 12.

On the feed-spindle sleeve 6 a clip 13 furnished with a circular groove is seated, in the groove of which a vertically movable bolt 14 takes hold. The bolt prevents any longitudinal movement of the feed-spindle sleeve during the backward movement of the support 1. At the end of the backward movement the bolt is pushed out of the groove in the clip 13, this being effected by a pin 15 on the driving wheel 16 of the operating shaft which comes at a suitable moment in engagement with a roller 17, which is arranged on the sleeve 18 firmly connected with the bolt 14. At every rotation of the wheel 16 and of the operating shaft 12, therefore, the sleeve 18 and therewith the bolt 14 is drawn downward at the end of the movement of the support 1 to the left, so that at this moment, under the action of the spring 8 the feed-spindle sleeve can spring to the left out of the spindle 2. As long as there is any material, this however cannot occur, as the material held on the one hand in the conical grip 5 and on the other hand in the feed-spindle 7 prevents any movement of the feed-spindle sleeve 6.

If however there is no longer any material, the feed-spindle sleeve 6 can move freely to the left after the bolt 14 has moved downward. Against the clip 13 lies a second bolt 19, which oscillates around the pin 20 and itself carries a pin 21. When the sleeve 6 moves to the left, the bolt 19 moves through the action of the spring 19ᵃ around the pin 20 and comes with its shoulder 22 into a slot in the bolt 14. As the bolt 14 moves farther downward the bolt 19 is carried along therewith accordingly. The pin 21 lies against the rod 23 and presses it downward. Through this downward movement the stopping of the machine is effected in the usual manner, the lever 24 being pressed down and thereby the bolt 25 released, so that the handle 27 serving for disengaging by hand can now move around its pin 28. As the spring 30 (Fig. 2) that acts on the disengaging rod 29 is stronger than the spring 26, the handle 27 turns so that the disengaging rod 29 moves the coupling 31 out of the driving wheel 32.

As the support 11 must be arranged so near to the support 1 that even when the latter is moved to the extreme left an exchange of the conical grip cannot be effected, without taking the spindle out of the support, the bolt 19 which in earlier forms of construction lay in front of the clip 13 and restricted the movement of the support 1 is arranged to pivot around a pin 33 in the bearing 34. A piston 36 holds it in the working position. Moreover in the frame of the machine a handle 35 is mounted, which lies on a stop arranged on the sleeve 18. By rotating the handle 35 the sleeve 18 and therewith the bolt 14 is lowered and automatically locked in the lowered position. If in this position of the sleeve 18 the bolt 19 be turned around the pin 33 into an approximately horizontal position, the whole space behind the spindle is free and the spindle 2 can be moved so far to the left with the support 1 that the conical grip can be reached from the front so as to be exchanged.

Having now particularly described and ascertained the nature of my said invention and in what manner the same is to be performed, I declare that what I claim is:

1. An automatic lathe containing in combination, a spindle, movable to and fro in the course of the working, a feed spindle sleeve within said spindle, means behind the spindle for the purpose of locking the feed spindle sleeve and releasing it at each stroke for a short time, and being movable down out of the path of the spindle for the purpose specified, said feed spindle sleeve being held within the said spindle as long as there is any material, means for pushing it out of the said spindle when there is a failure of material, means for bringing the lathe to a standstill controlled by the pushing out of the feed spindle sleeve and being turnable down around a horizontal axis out of the path of the spindle, and means for locking the first mentioned means in the lower position.

2. An automatic lathe containing in combination a spindle, movable to and fro in the course of the working, a feed-spindle sleeve within said spindle, means behind the spindle for the purpose of locking the feed-spindle sleeve and releasing it at each stroke for a short time and being movable down out of the path of the spindle for the purpose specified, and means for locking the first mentioned means in the lower position.

3. An automatic lathe containing in combination a spindle, movable to and fro in the course of the working, a feed-spindle sleeve within said spindle, means behind the spindle for the purpose of locking the feed-spindle sleeve and releasing it at each stroke for a short time and being movable down out of the path of the spindle for the purpose specified, and hand actuated means for lowering the first mentioned means and locking it in the lower position for the purpose specified.

4. An automatic lathe containing in combination a spindle movable to and fro in the course of the working, a feed-spindle sleeve within said spindle, means behind the spindle for the purpose of locking the feed-spindle sleeve and releasing it at each stroke for a short time, said feed-spindle sleeve being held within the said spindle as long as there is any material, means for pushing it out of the said spindle when there is a failure of material and means for bringing the lathe to a standstill, containing a member brought by the pushing out of the feed-spindle sleeve in the way of the said means for locking and releasing the feed-spindle sleeve and being positively moved by said last mentioned means thereby bringing the lathe to a standstill.

5. An automatic lathe containing in combination a spindle, a spindle support movable to and fro in the course of the working, a feed-spindle sleeve within said spindle, a bolt behind the spindle for the purpose of locking the feed-spindle sleeve and releasing it at each stroke for a short time, means for holding the feed-spindle sleeve within the said spindle as long as there is any material, means for pushing it out of the said spindle when there is a failure of material, and a bolt controlled by the pushing out of the feed-spindle sleeve and bringing the lathe to a standstill, said first mentioned bolt being movable down out of the path of the spindle for the purpose specified, and means for locking it in the lower position for the purpose specified.

6. An automatic lathe containing in combination a spindle, a spindle support movable to and fro in the course of the working, a feed-spindle sleeve within said spindle, a bolt behind the spindle for the purpose of locking the feed-spindle sleeve and releasing it at each stroke for a short time, means for holding the feed-spindle sleeve within the said spindle as long as there is any material, means for pushing it out of the said spindle when there is a failure of material, and a bolt controlled by the pushing out of the feed-spindle sleeve and bringing the lathe to a standstill, said first mentioned bolt being movable down out of the path of the spindle for the purpose specified, and hand actuated means for lowering the said bolt and locking it in the lower position for the purpose specified.

In testimony whereof I have affixed my signature in presence of two witnesses.

KARL JUNG.

Witnesses:
 WOLDEMAR HAUPT,
 HENRY HASPER.

Copies of this patent may be obtained for five cents each, by addressing the "Commissioner of Patents, Washington, D. C."